No. 806,377. PATENTED DEC. 5, 1905.
T. L. & T. J. STURTEVANT.
CLUTCH DEVICE.
APPLICATION FILED JAN. 25, 1905.

Witnesses:
C. M. Sweeney
Gertrude M. Stucker

Inventors:
Thomas L. Sturtevant
Thomas J. Sturtevant
by Henry Calver
Attys.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CLUTCH DEVICE.

No. 806,377.      Specification of Letters Patent.      Patented Dec. 5, 1905.

Original application filed December 10, 1904, Serial No. 236,360. Divided and this application filed January 25, 1905. Serial No. 242,702.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizen of the United States, have invented or discovered certain new and useful Improvements in Clutch Devices, of which the following is a specification, reference being had therein to the accompanying drawings.

This invention relates to a centrifugal clutch device more especially intended for use in a variable-speed mechanism by which power may be transmitted from a motor or driving part to a shaft or part to be driven and in which the changes from low speed to high speed, and vice versa, of the driven shaft or part will be automatically effected so that if the resistance or load on the driven part be increased beyond a certain predetermined point relative to the speed of rotation of the driving-shaft or the power of the motor when the driven part is running at high speed a change from high speed to low speed of the driven part will be automatically effected and when the resistance of the driven part is below a certain predetermined limit relative to the speed of rotation of the driving part or power of the motor a change from low speed to high speed of the driven part will likewise be automatically effected.

The mechanism hereinafter described is similar in operation to the power-transmitting mechanism covered by our United States Patent No. 766,551, granted August 2, 1904, and provides a somewhat simpler, and for some purposes a more efficient, mechanism than that of our said patent for accomplishing similar results.

Figure 1:
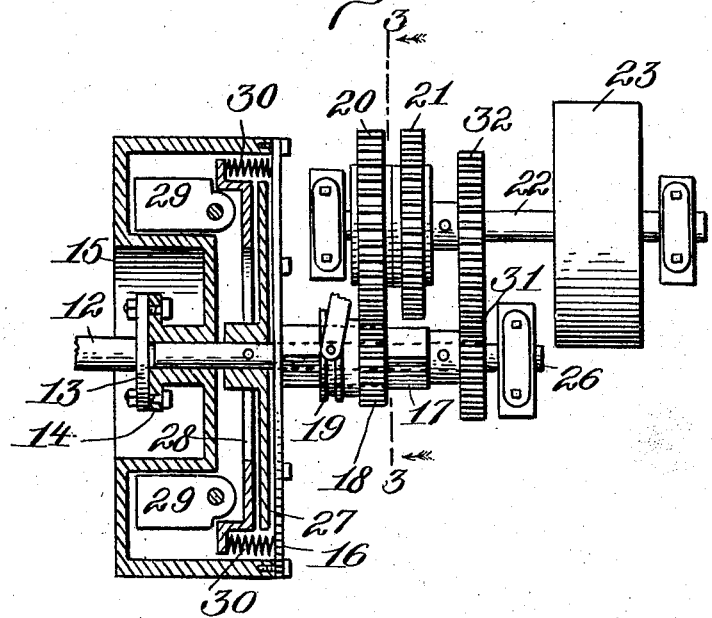
Figure 2:
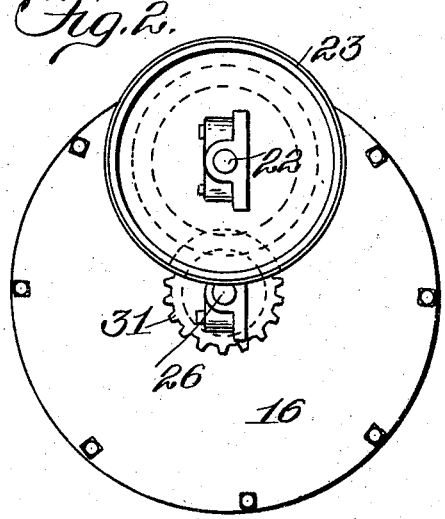
Figure 3:
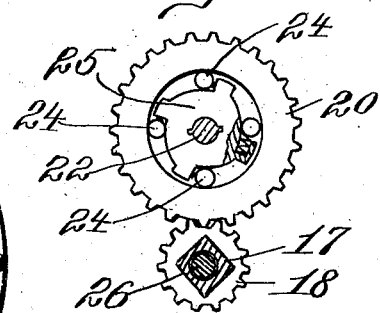

In the accompanying drawings, Figure 1 is an elevation, partly in section, of a mechanism embodying the present invention. Fig. 2 is an end view of the same looking from the right of Fig. 1. Fig. 3 is a detail section of the same on line 3 3, Fig. 1, looking in the direction of the arrows adjacent to said line.

Referring to the drawings, 12 denotes a portion of a motor or power-shaft having a flange 13 bolted to a similar flange 14 on the hub of a fly-wheel or casing 15, having a rigidly-attached cover-plate 16, secured to or integral with which is an exteriorly-squared sleeve 17. On the sleeve 17 is mounted a gear-wheel 18, provided with a grooved sleeve 19, adapted to slide endwise on the sleeve 17 (which is loose on the shaft 26) to permit the gear-wheel 18 to be engaged with either of the gears 20 or 21, fast on or connected with the driven shaft 22, which may be directly utilized for driving an automobile, boat, or for other purposes or may be provided with a pulley 23 for transmitting power for any desired purpose. The gears 20 and 21 will each preferably be connected with the shaft 22 through the medium of a silent ratchet or grip device, such as that shown and described in our Patent No. 766,551, hereinbefore mentioned, and comprising spring-pressed friction grip-rollers 24, interposed between a hub 25, fast on said shaft, and a ring-gear 20 or 21, as the case may be, these silent ratchet or grip devices being reversely arranged in the two gear-wheels, so that one may be utilized for the forward drive of the motor or power-shaft 12 and the other for the reverse motion of said shaft or of the driving-motor, the sliding gear-wheel 18 being shifted to proper position in each instance, as by a shifting-arm 32, for the forward or the reverse drive, and these silent ratchet or grip devices being adapted to permit the low-speed gear-wheels or gear-rings 20 and 21 to overrun, and thus be non-operative when the high-speed clutch device hereinafter described is in operation.

Pinned to the high-speed shaft 26 is a clutch disk or plate 27, with which coöperates for the high-speed drive a second clutch disk or plate 28, rotating with the hollow fly-wheel or casing 15 and having shoulders engaged by shoulders on centrifugal weights 29, pivotally mounted within the said fly-wheel or casing 15 and normally held in their inner or inoperative positions by springs 30, interposed between parts of said disk or plate 28 and the casing or cover-plate 16 of the fly-wheel. The springs 30 are located adjacent to the inner wall of the peripheral portion of the casing of said fly-wheel, and the centrifugal weights 29 are located within the peripheries of the clutch-disks instead of being outside of the peripheries of the clutch-disks, as in the construction shown by our said Patent No. 766,551, and from this it results that the clutch-disks may be extended nearer to the periphery of the clutch fly-wheel than in our former construction, so as to have more purchase or leverage with a wheel of a given size or so as to permit the use of a smaller fly-wheel with an equal clutch power.

When the speed of the motor or driving part is sufficient to cause the centrifugal weights 29 to swing outward to overcome the stress of the springs 30, the clutch-disk 28 will be forced into frictional engagement with the clutch-disk 27, fast on the shaft 26, and thus the rotary movement of the motor or power-shaft and of the fly-wheel 15 will be imparted to said shaft 26 through the said friction clutch-disks, and the motion of said shaft 26 will be transmitted to the driven shaft 22 through the high-speed gears 31 and 32, fast on the shafts 26 and 22, respectively. When the load on the driven shaft increases beyond or the speed or power of the driving-motor decreases below certain predetermined limits as fixed by the stress or power of the springs 30 relative to the centrifugal action of the weights 29, the friction clutch-disks will be disengaged from each other by the stress of said springs, so that the low-speed driving-gear will automatically come into action and will continue until the stress of the springs 30 is again overcome by the increased speed of rotation of the fly-wheel 15. Thus changes from high speed to low speed and vice versa of the driven part or shaft will be automatically and smoothly effected in that the clutch-disks inclosed within the fly-wheel casing may run in oil, so that there may be more or less slip when the changes take place.

While the high-speed clutch device herein shown comprises only two clutch-disks, it will be understood that any desired number of clutch disks or rings may be employed—for example, such as shown in our said patent—and the details of the invention may be otherwise varied without departing from the spirit or essence thereof, the particular construction or arrangement of the gearing and shafts herein shown and described not being essential to the practical embodiment of our invention. Also other forms of centrifugal clutches might be used instead of the disk or multiple-disk clutch construction.

We do not herein claim the variable-speed power-transmitting mechanism, including the gearing, herein shown and described, as the said variable-speed mechanism is embraced by our application, Serial No. 236,360, filed December 10, 1904, of which this application is a division.

Having thus described our invention, we claim and desire to secure by Letters Patent—

A power-transmitting mechanism, comprising the combination with a driving shaft or part 12, and a shaft or part 26 to be driven, of a centrifugal clutch device comprising a hollow fly-wheel, a clutch-disk connected with said shaft 26, a second clutch-disk rotating with said fly-wheel, centrifugal weights within said fly-wheel and pivoted within the peripheries of said disks and engaging said second clutch-disk, and springs, acting in opposition to said weights, also inclosed within said fly-wheel and located adjacent to the inner wall of the periphery of said fly-wheel.

In testimony whereof we affix our signatures in presence of two witnesses.

THOMAS LEGGETT STURTEVANT.
   THOMAS JOSEPH STURTEVANT.

Witnesses:
 W. Welles,
 L. H. Sturtevant.